United States Patent
See et al.

(10) Patent No.: US 9,714,389 B2
(45) Date of Patent: Jul. 25, 2017

(54) METHOD OF REMOVING OIL SLUDGE AND RECOVERING OIL FROM OIL SLUDGE WITH NANOEMULSION SURFACTANT SYSTEM

(71) Applicant: BCI CHEMICAL CORPORATION SDN. BHD., Selangor (MY)

(72) Inventors: Chun Hwa See, Selangor (MY); Wasan Saphanuchart, Selangor (MY); Ming Hoong Looi, Selangor (MY); Yang Loong Chong, Selangor (MY)

(73) Assignee: BCI SABAH INTERNATIONAL PETROLEUM SDN. BHD., Kuala Lumpur (MY)

( * ) Notice: Subject to any disclaimer, the term of this patent is extended or adjusted under 35 U.S.C. 154(b) by 457 days.

(21) Appl. No.: 14/395,481

(22) PCT Filed: Apr. 22, 2013

(86) PCT No.: PCT/MY2013/000087
§ 371 (c)(1),
(2) Date: Oct. 18, 2014

(87) PCT Pub. No.: WO2013/157921
PCT Pub. Date: Oct. 24, 2013

(65) Prior Publication Data
US 2015/0068950 A1    Mar. 12, 2015

(30) Foreign Application Priority Data

Apr. 20, 2012  (MY) .................... PI 2012700208

(51) Int. Cl.
*C10G 29/22* (2006.01)
*B01D 11/02* (2006.01)
*C10G 1/04* (2006.01)
*C09K 8/524* (2006.01)

(52) U.S. Cl.
CPC .......... *C10G 29/22* (2013.01); *B01D 11/0288* (2013.01); *C10G 1/04* (2013.01); *C09K 8/524* (2013.01)

(58) Field of Classification Search
CPC .................................................. C10G 29/22
See application file for complete search history.

(56) References Cited

U.S. PATENT DOCUMENTS

| 4,945,933 A | 8/1990 | Krajicek et al. |
| 5,091,016 A | 2/1992 | Krajicek et al. |
| 5,460,331 A | 10/1995 | Krajicek et al. |
| 5,627,144 A | 5/1997 | Urfer et al. |
| 5,968,370 A * | 10/1999 | Trim ...................... B01D 21/01 210/723 |
| 6,000,412 A * | 12/1999 | Chan ................... C11D 11/0041 134/22.14 |
| 6,069,002 A | 5/2000 | Powell, Jr. |
| 6,197,837 B1 * | 3/2001 | Hill ......................... C01B 17/92 106/277 |
| 2003/0006040 A1 * | 1/2003 | McGregor ............... C09K 8/52 166/312 |
| 2008/0047871 A1 | 2/2008 | Brons et al. |
| 2008/0296222 A1 * | 12/2008 | Harrison ................... B09C 1/02 210/632 |
| 2009/0173363 A1 | 7/2009 | Wahnich |
| 2013/0079255 A1 * | 3/2013 | Del Gaudio ........... C09K 8/524 507/90 |

FOREIGN PATENT DOCUMENTS

| JP | 8310589 | 11/1996 |
| WO | 03002275 | 1/2003 |
| WO | 2010019548 | 2/2010 |

OTHER PUBLICATIONS

International Preliminary Report on Patentability Dated Oct. 21, 2014.
International Search Report Dated Sep. 3, 2013.
Written Opinion of the International Searching Authority Dated Sep. 3, 2013.
English Abstract of JP8310589.

* cited by examiner

*Primary Examiner* — Randy Boyer
(74) *Attorney, Agent, or Firm* — Preston Smirman; Smirman IP Law, PLLC

(57) ABSTRACT

A method of treating a first batch of oil sludge containing entrapped oil residue comprises the steps comprises the steps of bringing into contact the first batch of oil sludge to a liquid composition of an emulsion with or without a carrier, wherein the emulsion comprises an alkylpolyglucoside surfactant in 2 to 40% by weight of total composition; a co-surfactant in 1 to 30% by weight of total composition selected from the group consisting of C3 to C18 alcohols, C3 to C18 alkyl lactates, lecithins, C3 to C18 fatty acids and any mixtures thereof; an oil phase in 15 to 90% by weight of total composition; and an aqueous phase in 0.5 to 20% by weight of total composition; homogenizing the liquid composition with the first batch of oil sludge; and fluidizing the oil sludge that the oil residues are substantially dissociated from the solid object forming a liquid phase including the liquid composition and the separated oil.

25 Claims, No Drawings

METHOD OF REMOVING OIL SLUDGE AND RECOVERING OIL FROM OIL SLUDGE WITH NANOEMULSION SURFACTANT SYSTEM

CROSS-REFERENCE TO RELATED APPLICATION

The instant application is a national phase of PCT International Patent Application Serial No. PCT/MY2013/000087, filed Apr. 22, 2013, and claims priority to Malaysian Patent Application Serial No. PI 2012700208, filed Apr. 20, 2012, the entire specifications of both of which are expressly incorporated herein by reference.

FIELD OF INVENTION

The present invention relates a method of recovering oil residue from oil sludge. In more detail, the disclosed method employs an emulsion composition together with or without a liquid carrier to recover the oil residue from solid or semi-solid object such as in the crude oil sludge.

BACKGROUND OF THE INVENTION

Crude oil pumped out from wells is normally directed to tanks for temporary storage before it is transported to refinery or manufacturing purposes. Regular examination has to be performed onto the crude oil storage tank to avoid accidental spill caused by the tank leakage. However, quiescent state of the crude oil in the storage tank prompts settlement of heavier fraction at the bottom of the tank forming a sludge layer thereof. The sludge mainly presented in a form of stable emulsion consists of long chain paraffin, asphaltenes, inorganics and water. Sludge layer must be removed from the tank before proper inspection can be performed. Apart from that, the formed sludge layer also reduces storage capacity of the tank and interfere connection in between the tank to the refinery. It has been reported as well sludge accumulation interrupts operation of floating roof of the storage tank especially when the crude oil level is low in the tank. Considering problems can be initiated by the presence of sludge layer in the tank, effort has been put up to devise better ways to remove the sludge layer. Still, the process is very costly and time-consuming even after years of research.

It is important to be noted that sludge removal process generally includes as well treatments such as separation and oil recovery from the sludge prior to disposal of the sludge. Discharge of improperly treated sludge can inflict great damage to the environment. Since sludge is adherent in a solid or semi-solid form, it is impossible to be channeled out from the tank via pressure pump. Physically removing the sludge using machines or human force is the most common applied approach that, sometimes, it may be assisted by melting the sludge using heated medium like steam. For example, Japanese patent application no. 8310589 and International patent application no. 03002275 disclose specially designed system for removing sludge physically from the tank. Such approach may be, able to clean the tank, while the process is time-consuming and labor-intensive. Even cleaning a single tank, it takes days to complete. Further, post treatment after removing the sludge physically, like centrifugation or filtration, always fails to clean all the oil residues off solid particles in the sludge and it is unlikely to dispose the sludge without polluting the surrounding environment.

Beside physical removal, re-suspending the sludge into an oil fraction is another option to reduce depth of the sludge inside the tank. Preferably, the oil fraction is introduced on top of the sludge under high pressure, while preheating or vortex may be applied to accelerate dissolution of the sludge back into the crude oil. For example, U.S. published patent 2008/0047871 and International Patent Application 2010019548 respectively describe sludge removal using high solvent power (HSP) crude oil and atmospheric residue fraction of high solvency dispersive power crude oil. Other U.S. Pat. Nos. 4,945,933, 5,019,016 and 5,460,331 disclose different apparatus equipped with a circulator coupled to rotatable nozzles to create jet flow for dispersing sludge in crude oil tank. Though re-suspension or re-dispersion work well in discharging the sludge out from the tank, the discharged sludge of these patents may eventually deposit somewhere in the subsequent downstream processes and further treatment is needed to extract the oil before dumping the sludge. In view of this, United States published patent 2009/0173363 proposes deployment of filtration means to remove the solid particles along pumping out the crude oil suspension from the tank to avoid re-deposition of the sludge. At least two filtering means are disposed in the disclosed system to facilitate frequent filter exchange. Still, it is impossible to achieve near complete extraction of oil residue from the sludge through centrifuge or cyclone. While decomposing the sludge using biological agent is described in U.S. Pat. No. 6,069,002, the process requires a prolonged period in order to fully break down the sludge.

Some of the above mentioned approaches may have achieved significant results in sludge removal. Yet these approaches are far from cost and energy efficient. Ideally, the process or the composition used in sludge removal shall be able to drive recovery of the entrapped oil residues from the solid particle in a spontaneous mechanism without much machinery or energy intervention.

SUMMARY OF THE INVENTION

The present invention provides a method of recovering oil residue, particularly crude oil residue, entrapped to solid or semi-solid objects, such as crude oil sludge accumulated in the crude oil storage tank. In more specific, the present invention employs a unique water-in-oil emulsion in the disclosed method to attain effective separation and recovering of the crude oil reside in the oil sludge.

Also another object is to offer energy and cost efficient method for recovering crude oil from the contaminated solid and semi-solid objects. Through performing the disclosed method in a preferred condition with the unique emulsion composition, less mechanical or energy intervention is needed to achieve significant oil recovery compared to conventional approaches.

Moreover, the liquid phase obtained from the recovered oil sludge using the disclosed method can be reused for several times without apparent decrease in efficiency. Thus, the disclosed method is able to reuse and recycle the liquid phase of the treated oil sludge for subsequent oil sludge treatment.

Still another object of the present invention is to offer a method to substantially clean crude oil contaminated soil with ease. The contaminated soil may be resulted from accidental oil spillage.

Further object of the present invention is to disclose a method for cleaning sludge, especially crude oil sludge, deposited in a storage tank. Through the nano-emulsion in the described composition, the separation of the oil residues from the solid particles is spontaneous thus reducing viscosity of the sludge to facilitate subsequent removal of the sludge from the tank later.

At least one of the preceding objects is met, in whole or in part, by the present invention, in which one of the embodiments of the present invention includes a method of treating a first batch of oil sludge containing entrapped oil residues comprising the steps of bringing into contact the first batch of oil sludge to a liquid composition of an emulsion with or without a carrier, wherein the emulsion comprises an alkylpolyglucoside surfactant in 2 to 40% by weight of total composition; a co-surfactant in 1 to 30% by weight of total composition selected from the group consisting of C3 to C18 alcohols, C3 to C18 alkyl lactates, lecithins, C3 to C18 fatty acids and any mixtures thereof; an oil phase in 15 to 90% by weight of total composition; and an aqueous phase in 0.5 to 20% by weight of total composition; homogenizing the liquid composition with the first batch of oil sludge; and fluidizing the oil sludge that the oil residues are substantially dissociated from the solid or semi-solid object forming a liquid phase including the liquid composition and the separated oil. Preferably, the surfactant/cosurfactant ratio ranges from 1/10 to 20/1.

Preferably, the liquid composition and the oil sludge are heated to a preferred temperature during the homogenizing step.

In another embodiment, the method may further comprise the step of recycling the liquid phase or portion of the liquid phase to a second batch of oil sludge to separate oil residue from the solid objects in the second batch of oil sludge.

In another embodiment, the disclosed method involves additional step of continuously removing the separated solid objects from the liquid phase and/or adding new volume of oil sludge into the liquid phase.

Preferably, the emulsion has a concentration of at least 0.01 to 10% by weight of the total liquid composition upon using carrier, while the liquid composition and the oil sludge are in a ratio of 1-10:20 by weight percentage. More preferably, the carrier is light crude oil, paraffin oil, diesel, mineral oil, kerosene, glycols, liquid hydrocarbons with viscosity less than 5000 cps at 25° C., water, salt water or brine.

According to one preferred embodiment, the emulsion further comprises a pour point depressant and/or wax inhibitors selected from the group consisting of ethylene/alkene copolymers, ethylene/vinyl acetate copolymers, ethylene acrylonitrile copolymers, acrylate ester polymers, methacrylate ester polymers, maleic copolymers, alkyl phenol-formaldehyde resins, hexatriethanolamine oleate esters, polyolefin or any combination thereof in 5 to 40% by weight of total composition.

Still, in another embodiment, the emulsion used in the present method further comprises a chelating agent selected from the group consisting of any one of combination of ethylenediamine tetraacetic acid, hydroxyethylenediamine triacetic acid, nitriolotriacetic acid, citric acid, acetylacetone, porphyrin, catechol, dithiolene phosphonic acids and their salts, polyphosphates, phosphate esters, nonpolymeric phosphonates, aminophosphonates, polyphosphonates phosphino polymers, polyphosphinates, polycarboxylates, and polysulfonates in 1 to 10% by weight of total composition.

Still, in another embodiment, the emulsion further comprises a corrosion inhibitor selected from the group consisting of any one or combination of phosphate esters, amine salts of carboxylic acid, amine salts of polycarboxylic acid, quaternary ammonium salts, quaternary imminium salts, amidoamines, imidazolines, amides, polyhydrxy amines, polyhydroxy amides, ethoxylated amines, ethoxylated amides, and polyaminoacides in 1 to 5% by weight of total composition.

Further a flocculant selected from the group consisting of any one or combination iron(III) salts, zinc(II) salts, aluminum(III) salts diallyldimethylammonium chloride polymers, acrylamide-based polymers, acrylate-based polymers, polyalkyleneimines, polyalkanoamines, polyvinylammonium chloride, polyallylammonium chloride, branched polyvinylimidazoline acid salts, polysaccharides, chitosan, condensed tannins, dithiocarbamates, hydrolyzed polyacrylamide-grafted xanthan gum, poly-γ-glutamic acid, and polyaspartic acid in 1 to 10% by weight of total composition can be incorporated in the emulsion employed in the disclosed method.

DETAILED DESCRIPTION OF THE INVENTION

It is to be understood that the present invention may be embodied in other specific forms and is not limited to the sole embodiment described herein. However modification and equivalents of the disclosed concepts such as those which readily occur to one skilled in the art are intended to be included within the scope of the claims which are appended thereto.

The term "sludge" used herein throughout the description shall refer to thick, viscous hydrocarbons sometimes containing water, sediment and/or residue that form after the aging of the sedimentation. The term "oil" includes hydrocarbons, triglycerides; esters, fatty alcohols and oil soluble silicones. Further, the oil residue can be fossil-based, animal-based or plant-based oil.

The "nano-sized" emulsion used in the disclosed composition preferably refers to droplets of the discontinuous phase in the size not exceeding 200 nm.

The present invention is a method of treating a first batch of oil sludge containing entrapped oil residues comprising the steps of bringing into contact the first batch of oil sludge to a liquid composition of an emulsion with or without a carrier, wherein the emulsion comprises an alkylpolyglucoside surfactant in 2 to 40% by weight of total composition; a co-surfactant in 1 to 30% by weight of total composition selected from the group consisting of C3 to C18 alcohols, C3 to C18 alkyl lactates, lecithins, C3 to C18 fatty acids and any mixtures thereof; an oil phase in 15 to 90% by weight of total composition; and an aqueous phase in 0.5 to 20% by weight of total composition; homogenizing the liquid composition with the first batch of oil sludge; and fluidizing the oil sludge that the oil residues are substantially dissociated from the solid object forming a liquid phase including the liquid composition and the separated oil. Preferably, the surfactant/cosurfactant in the emulsion has a ratio of 1/10 to 20/1.

Preferably, the oil sludge is in a solid or semi-solid phase which can be crude oil sludge or crude oil contaminated soil. Voids may be presented in the solid particles entrapping the oil residue, therefore reducing mobility and flowability of the oil sludge rendering removal of the sludge infeasible. With the aid of the specially designed emulsion, the present invention is able to re-suspend the crude oil residues into liquid phase or even separate the crude oil residues from being entrapped to the solid phase thereafter. More particularly, the emulsion used in the described method is prepared in the form of nanoemulsion with ultra-low interfacial tension, preferably in the form of Winsor Type III emulsion or near Winsor Type III emulsion. The ultra-low interfacial tension and the nano-sized water droplets in the emulsion tend to adhere and spread through surface of a solid object when the condition of use is right. Thus, the disclosed method is able to displace the oil residue, especially crude oil residue, from the surface of the solid objects for oil recovery and sludge treatment. The oil phase of the emulsion composition serves as a transportation medium for delivering the enclosed water droplets into contact with the crude oil adhered on the surface of the solid objects in the sludge. Owing to the nano-size and ultra-low interfacial tension as well as presence of the oil phase, the nano-sized water droplets can seep through the contacting surface in between the crude oil and the solid object and instantly wet this surface of the solid object. Once the surface of the solid object in the sludge is water-wet or become hydrophilic, it displaces or repels the crude oil from the solid surface.

This mechanism is thermodynamic driven and spontaneous requiring minimal intervention. Displacement of the crude oil residue or other oil residues from the surface of the solid objects in the sludge, particularly sludge in the crude oil storage tank, has tremendously soften the sludge and reduces viscosity thereby. More preferably, the crude oil sludge is separated into two or three major phases, namely the displaced oil phase on top, a coalescent water layer at the middle and the settled solid particles at the bottom. To be noted the emulsion containing-liquid phase, which can be the displaced oil phase or coalescent water phase or both, can be recycle for subsequent sludge treatment as described in the below section. According to one preferred embodiment, the oil phase is collected for refinery while solid particles are disposed with or without further treatment. To bring the liquid composition into contact with solid and/or semi-solid phase at increased rate, mechanical agitation, mixing, flushing and/or homogenizing are preferably implemented in the present invention. Moreover, in sludge containing entrapped water droplets in the form of emulsion, surfactants of the disclosed composition results in the coalescent of the water droplets in the sludge forming larger water aggregate that it further separates water from the oil residue. Segregation of the water and solid particles in the treated sludge hence improves flowability of the sludge and can be channelled out of the tank In conjunction with the use of the mentioned emulsion, the disclosed method can recycle or reuse the liquid phase containing both oil residue and the emulsion for treating the new volume of oil sludge. The liquid phase mentioned herein specifically refers to liquid portion or a flowable fraction acquired from the treated first batch of oil sludge. Depending on the grade and types of oil sludge treated, the liquid phase in the disclosed invention can also refer to flowable fraction composed of a mixture of the solid objects and oil residues as well as the emulsion besides pure liquid fraction of oil residues and the emulsion. More specifically, the disclosed method may additionally comprise the step of recycling the liquid phase or portion of the liquid phase to a second batch of oil sludge, wherein the second batch of oil sludge containing entrapped oil residue; and homogenizing the liquid phase or portion of the liquid phase to the second batch of oil sludge to separate oil residue from the sludge. Prior to recycling the liquid phase, treatment for separating the solid objects out of the flowable fraction may be performed. Preferably, the disclosed method pumps the crude oil through a solid-liquid separator to segregate out solid particles, water and oil. The separator can be centrifuge, cyclone, liquid-solid separator, gravitational sedimentation separator, sedimentation pond or any means of separation method that can displace high density solid from oil and water.

In another embodiment, the disclosed method involves additional step of continuously removing the substantially separated solid objects from the liquid phase and/or adding new volume of oil sludge into the liquid phase. More specifically, in a continuous process for treating the oil sludge, part of the separated and precipitated solid objects maybe removed from the system for disposal or further treatment. Thus, fluidity of the remaining oil sludge and liquid phase is significantly increased. Further, in another embodiment, new volume of oil sludge may be added into the system while the substantially separated solid objects are being removed. This is another approach of the disclosed method to recycle and reuse the liquid phase for oil sludge treatment provided that, but not limited to, the newly added volume of oil sludge at least limitedly flowable.

Moreover, it was found by the inventors of the disclosed invention that the disclosed invention can be implemented with or without the liquid carrier. In the absence of liquid carrier, much higher volume of the emulsion formulation is required to fully cover and suspend the crude oil sludge or the contaminated solid objects that incurring higher operational cost. On the other hand, the embodiment using the liquid carrier increases the contactable surface area of the nanoemulsion for displacing the crude oil residues and assist in separation or dissolution of the sludge. The liquid carrier compatible with the disclosed invention can be an aqueous based or hydrocarbon-based solvent. The hydrocarbon-based solvent is light crude oil, diesel, mineral oil, kerosene, aromatic hydrocarbons, glycols, or other liquid hydrocarbon with viscosity less than 5000 cps at 25° C. More preferably, the light crude oil employed has API gravity higher than 31° API or 870 kg/m$^3$. The aqueous solvent can be water, salt water, or brine. Relying on the types of liquid carrier used in the present invention, the outcome of different disclosed embodiments of the disclosed invention may be varied. For instance, aqueous liquid carrier may have the crude oil residues accumulated on top of the liquid carrier while the solid particles settled at the bottom of the carrier facilitating complete cleaning of the crude oil sludge. In contrast, using of light crude oil as carrier can have the crude oil sludge re-suspended in an accelerated rate compared to the aqueous liquid carrier while an additional separating step is needed at the subsequent downstream process to segregate the solid object and liquid phase. The separation step in the present invention may be performed using centrifuge, cyclone, liquid-solid separator, gravitational sedimentation or any other means of separation.

Preferably, the disclosed method can be employed at various mode of process. In one embodiment where the method is performed as a continuous process, the disclosed method may further comprise the step of introducing the liquid phase or portion of the liquid phase to the solid or semi-solid phase to continue separating crude oil from the solid or semi-solid phase. Specifically, the acquired separated crude oil together with the liquid composition is recycled back into the system to continue extracting the liquid oil from the crude oil sludge or re-suspend (re-dispersed) the sludge. Additional liquid composition may be injected, but not necessary; into the recycled liquid phase especially volume of the crude oil sludge to be removed or treated is large. Further, in the embodiment where the disclosed process is a batch process, the acquired separated liquid phase is channeled out from the tank containing the crude oil sludge together with the re-suspended sludge and treated with physical separation step as mentioned above without reusing the separated crude oil obtained from the system. Still in the embodiment of semi-batch process, the re-suspended crude oil together with the liquid composition from a primary tank is directed into at least one secondary tank containing a new batch of semi-solid or solid phase to generate a secondary fraction of liquid phase thereof, while the secondary liquid phase may be then channeled back to the primary tank or the secondary tank upon user preference for to continue the sludge removing process. In short, the method includes extra step of introducing the liquid phase or portion of the liquid phase to a secondary solid or semi-solid phase to separate crude oil from the secondary solid or semi-solid phase in this embodiment.

Additionally, the disclosed method in another embodiment may further comprise the step of heating the liquid composition and solid or semi-solid phase together during the homogenizing step. Applying heat energy into the mixture of liquid composition and solid or semi-solid phase expedite dissolution or extraction or re-suspension of the crude oil sludge into forming the liquid phase. Caution has to be taken when liquid hydrocarbon is used as the carrier that the heating temperature shall be few degree below the flash point of the carrier. In the case which aqueous-based carrier is used, the mixture is preferably heated above 25° C.

Preferably, the oil phase of the disclosed invention is any one or combination of terpenes, aromatic hydrocarbons, glycols, esters, fatty acid ester, fatty ester, glycol ethers, mineral oil, paraffin oil, plant-based oil, diesel, and petroleum distillates. More preferably, the petroleum distillates have flash point higher than 60° C. To impart better biodegradability and to be ecological friendly, terpenes such as d-limonene is preferably used to constitute the oil phase of the disclosed invention. The d-limonene can be acquired as plant extraction or being chemically synthesized.

It is known in the art that asphaltene and paraffin are other organic substances in the crude oil contribute to formation of the sludge. Particularly, depositional effects of oil sludge in storage tank and/or pipeline can largely attribute to presence of asphaltenes in the oil, while paraffin are alkanes with long carbon chain presented as solid mass in room temperature. These substances tend to interact and entrap water molecules in the crude oil sludge rendering low mobility to the sludge. In one embodiment of the disclosed method, the liquid composition and the first batch of oil sludge or the liquid phase and the second batch of oil sludge are heated during the homogenizing step. The introduced heat prompts dissolution of the paraffin into the emulsion used and renders the oil sludge flowable. The disclosed method may heat the oil sludge together with the liquid composition or the recycled liquid phase to a temperature of, but not limited to, 40 to 70° C. for sufficiently melting the paraffin. To react more effectively for removing crude oil sludge containing high amount of asphaltene and/or paraffin, the disclosed method concurrently employs the emulsion additionally added with a pour point depressant and/or wax inhibitors in 5 to 20% by weight of total composition of emulsion. The pour point depressant and/or wax inhibitors in this embodiment react with the asphaltene and/or paraffin presented in the crude oil sludge, preferably via agglomeration and/or flocculation. The flocculated asphaltene and/or paraffin may be rid off from the separated crude oil layer through filtration, while the agglomerated particles are settled together with the solid particles. Further, eliminating these organic substances from the sludge also prevents potential interference caused towards the overall performance of the disclosed nanoemulsion, especially unwanted interaction with the water droplets in the nanoemulsion. The pour point depressant and/or wax inhibitors can be any one or combination ethylene/alkene copolymers, ethylene/vinyl acetate copolymers, ethylene acrylonitrile copolymers, acrylate ester polymers, methacrylate ester polymers, maleic copolymers, alkyl phenol-formaldehyde resins, hexatriethanolamine oleate esters, polyolefin or any combination thereof in 5 to 40% by weight of total composition. Apart from that, a stablilizer may be needed in the disclosed composition to stabilize the nanoemulsion in addition of the pour point depressant and/or wax inhibitors. Preferably, the stabilizer is any one of combination of dodecylbenzenesulfonic acid, arylalkanesulfonates, sulfosuccinate esters, alkyldiphenylether sulfonates, alkyldiphenylether disulfonates alkylnaphthalenesulfonates, naphthalenesulfonic acid-formaldehyde condensates in 1 to 10% by weight of total composition.

Further, a biocide in 1 to 5% by weight of total composition is added in one embodiment of the disclosed composition. Using of biodegradable components subjects the disclosed composition to potential fermentation from biological agent such as bacteria and fungus. The biocide prohibits growth of biological agent and prolongs shelf life of the disclosed composition. The biocide used in the present invention can be of oxidizing biocides or non-oxidizing biocides. For oxidizing biocide, it can be any one or combination of chlorine/hypochlorite or bromide/hypochlorite, hypochlorite salts, hypobromite salts, stabilized bromine chloride, hydroxyl radicals, chloramines, chlorine dioxide, chloroisocyanurates, halogen-containing hydantoins, hydrogen peroxide and hydrogen peracetic acid in 1 to 5% by weight of total composition. On the other hand, a non-oxidizing biocide can be selected from the group consisting of any one or combination of aldehyde biocides, quaternary phosphonium compounds, quaternary ammonium surfactants, cationic polymers, organic bromides, metronidazole, isothiazoles, isothiazolinones, thiones, organic thiocyanates, phenolic biocide, alkylamines, diamines, triamines, dithiocarbamates, 2-(decylthio)ethanamine and its hydrochloride, triazine derivatives, and oxazolidines in 1 to 5% by weight of total composition.

Pursuant to another preferred embodiment, the disclose composition or emulsion of includes a corrosion inhibitor which can ranged from 1 to 5% by weight of the total composition. Sudden liquefying of the accumulated crude oil sludge is likely to release previously entrapped oxidative agent into the storage tank. The released oxidative agent may then progressively erode the metal surface of the storage tank. The corroded surface possibly ruptures upon filling of the crude oil and leads to leakage. Most of the commercially available corrosion inhibitor is applicable in the present invention. Yet, the corrosion inhibitors is more preferably chosen from phosphate esters, amine salts of carboxylic acid, amine salts of polycarboxylic acid, quaternary ammonium salts, quaternary imminium salts, amidoamines, imidazolines, amides, polyhydrxy amines, polyhydroxy amides, ethoxylated amines, ethoxylated amides, polyaminoacides or any combination derived thereof.

Further, the disclosed method may use an emulsion additionally containing an acid selected from the group consisting of gluconic acid, lactic acid, methanesulfonic acids, urea hydrochloride, acetic acid, formic acid, citric acid, carboxylic acids with linear or branched alkyl groups and number of carbon atoms in the alkyl group from about 3-18, hydrochloric acid, hydrofluoric acid, hydrobromic acid, phosphoric acid, sulfuric acid, nitric acid, and boric acid in 5 to 10% by weight of total composition. The acid in the emulsion allows the disclosed method to break down or digest wax content and solid scale in the oil sludge. Presence of high wax content prompts the formation of macro-emulsion in the oil sludge that it reduces flowability of the oil sludge leading to clogging of the sludge in the tank or pipeline. Besides, some of the weak acids may be used together with its salts in the present invention to function as pH buffering agent for stabilizing the formed nanoemulsion for treating other types of oil sludge. Abrupt fluctuation of pH may lead to phase out of the nanoemulsion and hamper the efficiency of the disclosed method.

Owing to the fact that the collected oil residues from the oil sludge will be eventually reprocessed for fuel production, it is preferred the oil residues are concurrently pre-treated once it is released from the oil sludge. For achieving such purpose, a chelating agent preferably is incorporated into the emulsion as well with a concentration of 1 to 10% by weight of total composition to remove metal ion such as iron, vanadium, nickel and copper in the oil residues. Removing at least fraction of the metal ions from the collected oil residues through the disclosed composition relieves the subsequent downstream process.

In another embodiment, the emulsion further comprises a flocculant selected from the group consisting of any one or combination iron(III) salts, zinc(II) salts, aluminum(III) salts diallyldimethylammonium chloride polymers, acrylamide-based polymers, acrylate-based polymers, polyalkyleneimines, polyalkanoamines, polyvinylammonium chloride, polyallylammonium chloride, branched polyvinylimidazoline acid salts, polysaccharides, chitosan, condensed tannins, dithiocarbamates, hydrolyzed polyacrylamide-grafted xanthan gum, poly-γ-glutamic acid, and polyaspartic acid in 1 to 10% by weight of total composition.

The effective volume of the emulsion in the liquid composition is preferably of 0.05 to 10% by weight of the total liquid composition when carrier is used together, though higher concentration can be used as well. Further, the effective volume of the treating liquid composition and the oil sludge is in a ratio of 1-10:20 by weight percentage. Accordingly, the carrier can be light crude oil, paraffin oil, diesel, mineral oil, kerosene, glycols, and liquid hydrocarbons with viscosity less than 5000 cps at 25° C., water, salt water or brine.

EXAMPLE 1

The present invention presented in following examples are water-in-oil nanoemulsion with oil-water interfacial tension lower than 0.01 mN/m (measured at 25° C. by KRUSS spinning drop tensiometer; model SITE100). The mean particle size of the nanoemulsion is smaller than 200 nm (measured at 25° C. by particle size analyzer; Malvern Zetasizer Nano ZS). The sludge types listed in Table 1 were the samples used in testing various embodiments of the present invention. Properties of each sludge type were determined using the retort analysis.

TABLE 1

Properties of the sludge types

| Sludge | Color | Form | Source | Initial Sludge Weight (g) | Total Water content from Retort Test (g) | "Total" Oil Content from Retort Test (mL) | Wax at 25 C. (mL) | Density of Extracted Oil (g/mL) | Apprx. Weight of Extracted Oil (g) | % Oil that can be extracted up to 900° F. in Sludge (w/w %) | % Water Content in sludge (w/w %) | Solids (wt %) |
|---|---|---|---|---|---|---|---|---|---|---|---|---|
| A | Black | Dried | Refinery | 20 | 2 | 15 | 2 | 0.813 | 12.2 | 61.0 | 10.0 | 29.0 |
| B | Black | Dried | Refinery | 20 | 1.5 | 14.5 | 1.5 | 0.812 | 11.8 | 58.9 | 7.5 | 33.6 |
| C | Black | Wet | Distillation | 20 | 5 | 5 | 0.0 | 0.82 | 4.1 | 20.5 | 25.0 | 54.5 |
| D | Black | Lumpy | Crude oil platform | 20 | 1.5 | 16 | 1.5 | 0.823 | 13.2 | 65.8 | 7.5 | 26.7 |
| E | Black | Lumpy | Crude oil platform | 20 | 1.5 | 16 | 1.5 | 0.823 | 13.2 | 65.8 | 7.5 | 26.7 |
| F | Black | Wet & lumpy | Crude oil platform | 20 | 4 | 14 | 0.0 | 0.81 | 11.3 | 56.7 | 20.0 | 23.3 |
| G | Black | Lumpy with very strong smell | Distillation | 20 | 5.5 | 4 | 1.0 | 0.82 | 3.3 | 16.4 | 21.5 | 56.1 |
| H | Yellow-to-orange | Dried solid | Contaminated soil | 20 | 11.5 | 2.5 | 0.0 | 0.82 | 2.1 | 10.3 | 57.5 | 32.3 |
| I | Black to dark chocolate | Lumpy | Crude oil platform | 20 | 2.836 | 10.246 | 0 | 0.826 | 8.5 | 42.3 | 14.2 | 43.5 |

The present invention was tested with 2 kinds of crude oil tank bottom sludges (Sludge A and Sludge B) containing around 10 and 7.5 w/w % of water, respectively. The test was conducted at room temperature, 25° C. The 200 g of original sludge has been prepared in 250 glass mL beaker according to the composition in the table 2 below. Light crude having density of 30° API was used as carrier or diluent. The mixture was stirred for 15 minutes prior to measuring the viscosity at 25° C. using Brookfield viscometer model LVT and pour point using ASTM D97 Method. It was found that in case of the dried sludge, the liquid carrier was needed for dispersing the present invention through the sludge mixture.

Adding in small volume of light crude oil carrier (such as 10-20 w/w %) without the present invention into the sludge was not sufficient to achieve low viscosity at 25° C. The pour point was still higher than 45° C. Moreover, the solid such as sand particles in the sludge could not be separated out. However, if the 1000 ppm of the present invention (only 0.1 w/w %) was added to sludge together with the light crude oil carrier (~10-20 w/w %), the viscosity of the sludge mixture was significantly reduced to lower than 5000 cP and the pour point was reduced to lower than 25° C. The sludge was able to flow at normal room temperature. Sand and water were able to be separated out spontaneously by the action of the disclosed composition of the present invention. On the other hand, if sufficient amount of light crude oil carrier (such as 90 w/w %) was added to the sludge, the sludge would be flowable. Yet only large sand and solid particles settled down, while the fine particles of sand potentially suspended in the sludge/crude oil mixture. This mixture still requires doping by the present invention in order to completely separate the sand out from the sludge/crude oil mixture.

45° C. to lower than 15° C. No changes were observed in viscosity of all tested samples in the presence of the present invention even after 24 hours. Additionally, sand sedimentation was clearly observed after addition of the present

TABLE 2

Effectiveness of the present invention on viscosity and pour point reduction of the sludge from crude oil tank bottom

| Sample No. | Sludge (w/w %) | Carrier | Carrier (w/w %) | Oil phase in the present invention | The present invention (w/w % in sludge) | Viscosity at 25° C. (cP) | Pour Point (° C.) | Solid Sedimentation |
|---|---|---|---|---|---|---|---|---|
| Sludge A | | | | | | | | |
| A1 | 100 | No | 0 | NA | 0 | Dried/cannot measure | >45 | No |
| A2 | 90 | Light Crud Oil | 10 | NA | 0 | 21,200 | >45 | No |
| A3 | 90 | Light Crud Oil | 9.9 | Natural oil | 0.1 | 2,100 | 15 | Yes |
| A4 | 80 | Light Crud Oil | 20 | NA | 0 | 18,700 | >45 | No |
| A5 | 80 | Light Crud Oil | 19.9 | Natural oil | 0.1 | 1100 | 9 | Yes |
| A6 | 10 | Light Crud Oil | 90 | NA | 0 | <100 | <6 | Slightly |
| A7 | 10 | Light Crud Oil | 90 | Natural oil | 0.1 | <100 | <6 | Yes |
| Sludge B | | | | | | | | |
| B1 | 100 | No | 0 | NA | 0 | Dried/cannot measure | >45 | No |
| B2 | 80 | Light Crud Oil | 20 | NA | 0 | 48,600 | >45 | No |
| B3 | 80 | Light Crud Oil | 19.9 | Glycol oil | 0.1 | 2,900 | 21 | Yes |

EXAMPLE 2

In this example, sludge C containing much higher solid content was treated by addition of toluene as the carrier and the present invention containing natural oil. The result shows that addition of toluene as the carrier reduced the viscosity and pour point of the sludge at the beginning (Sample No. C2 and C3). Using larger amount of toluene helped in reducing the sludge viscosity. However, the viscosity and pour point could not be maintained at low level over time. Over time, the viscosity and pour point increased to more than 25,000 cP and 45 after 24 hours, respectively. Moreover, the solid sedimentation such as sand was not observed in the experiment.

After adding in small amount of the present invention into the sludge/toluene mixture (Sample No. C4-C5), it was found that the viscosity of the sludge/toluene mixture was significantly reduced. Adding larger amount of the present invention promotes decrease in the viscosity of the sludge/toluene mixture as well. The viscosity after the treatment using present invention could be as low as 300 cP. Pour point of the mixture after treatment decreased from higher than 45° C. to lower than 15° C. No changes were observed in viscosity of all tested samples in the presence of the present invention even after 24 hours. Additionally, sand sedimentation was clearly observed after addition of the present invention. Further, applying the present invention without carrier (sample no. C6) also showed significant reduction in pour point and viscosity of the sludge as well as promoting solid separation from the sludge. The results are shown in Table 3 below.

TABLE 3

| Sample No. | Sludge (gram) | Carrier | Carrier (gram) | Oil phase in the present invention | The present invention (gram) | Viscosity at 25° C. (cP) | Pour Point (° C.) | Viscosity at 25° C. after 24 hrs (cP) | Pour Point after 24 hrs (° C.) | Solid Sedimentation |
|---|---|---|---|---|---|---|---|---|---|---|
| Sludge C | | | | | | | | | | |
| C1 | 100 | No | 0 | NA | 0 | >25,000 | >45 | >25,000 | >45 | No |
| C2 | 100 | Toluene | 30 | NA | 0 | 3,000 | 15 | >25,000 | >45 | No |
| C3 | 100 | Toluene | 50 | NA | 0 | 2,100 | 15 | >25,000 | >45 | No |
| C4 | 100 | Toluene | 30 | Natural oil | 0.1 | 1,800 | <15 | 3,000 | <15 | Yes |
| C5 | 100 | Toluene | 30 | Natural oil | 1 | 800 | <15 | 800 | <15 | Yes |
| C6 | 100 | No | 0 | Natural oil | 50 | 300 | <15 | 300 | <15 | Yes |

EXAMPLE 3

Different from example 2, sludge D with higher oil content and low water and solid content was treated. Light crude having density of 30° API was used as carrier or diluent, while various embodiment of the present invention employing different kinds of oil phase such as natural oil, aromatics, and paraffin oil were used. It was found that the addition of carrier without the present invention could only reduce the viscosity of the sludge at the initial stage, but the viscosity gradually increased over time resulting in viscosity higher than 25,000 cP after 24 hours. Separation of solid from liquid phase was not observed.

Using different embodiments of the present invention constituted from different kinds of oil phase in the sludge/carrier mixture shows different efficiency to lower the viscosity of the sludge. The embodiment natural oil shows relatively higher efficiency in reducing viscosity of the sludge than the other embodiments containing aromatics and paraffin oil. Significant pour point reduction, to lower than 9° C., was observed after addition of the present invention into the sludge. The sand settlement at the bottom was found in all cases treated with the present invention. The viscosity of the mixture remained unchanged even after 24 hours. The results are shown in Table 4 below.

TABLE 4

| Sample No. | Sludge (gram) | Carrier | Carrier (gram) | Oil phase in present invention | The present invention (gram) | Viscosity at 25° C. (cP) | Pour Point (° C.) | Viscosity at 25° C. after 24 hrs (cP) | Pour Point after 24 hrs (° C.) | Pour Point after 3 month (° C.) | Solid Sedimentation |
|---|---|---|---|---|---|---|---|---|---|---|---|
| Sludge D | | | | | | | | | | | |
| D1 | 200 | Light Crud Oil | 20 | NA | 0 | >25,000 | 39 | >25,000 | 39 | No data | No |
| D2 | 200 | Light Crud Oil | 40 | NA | 0 | 15,000 | 24 | >25,000 | 33 | No data | No |
| D3 | 200 | Light Crud Oil | 20 | Natural oil | 0.5 | 8,000 | 15 | 11,000 | 21 | No data | Yes |
| D4 | 200 | Light Crud Oil | 20 | Natural oil | 1 | 7,500 | <9 | 6,000 | <9 | <9 | Yes |
| D5 | 200 | Light Crud Oil | 40 | Natural oil | 1 | 5,000 | <9 | 6,000 | <9 | <9 | Yes |
| D6 | 200 | Light Crud Oil | 40 | Natural oil | 5 | 300 | <9 | 330 | <9 | <9 | Yes |
| D7 | 200 | Light Crud Oil | 40 | Aromatic | 1 | 7,000 | <9 | 7,000 | <9 | <9 | Yes |
| D8 | 200 | Light Crud Oil | 40 | Paraffins | 1 | 6,500 | <9 | 7,000 | <9 | <9 | Yes |

EXAMPLE 4

This experiment was an up-scale test for investigating the impact of the present invention reacting on sludge of much larger volume in the crude oil tank. Sludge E was used for the test. The original quantity of the sludge for this up-scale test is 200 kg. Light crude having density of 30° API was used as carrier or diluent. It was found that introduction of the present invention is able to reduce viscosity and pour point of the sludge. The sand settlement at the bottom only observed in test sample treated with the present invention. The results are shown in Table 5 below.

TABLE 5

| Sample No. | Sludge (kilogram) | Carrier | Carrier (kilogram) | Oil phase in present invention | The present invention (kilogram) | Viscosity at 25° C. (cP) | Pour Point (° C.) | Viscosity at 25° C. after 24 hrs (cP) | Pour Point after 24 hrs (° C.) | Solid Sedimentation |
|---|---|---|---|---|---|---|---|---|---|---|
| Sludge E | | | | | | | | | | |
| E1 | 100 | Light Crud Oil | 20 | NA | 0 | >25,000 | 39 | >25,000 | 39 | No |
| E2 | 100 | Light Crud Oil | 20 | Natural oil | 0.5 | 5,000 | <9 | 5,000 | <9 | Yes |
| E3 | 100 | Light Crud Oil | 20 | Natural oil | 1 | 2,500 | <9 | 2,500 | <9 | Yes |

EXAMPLE 5

This experiment was performed to test on the effectiveness of the present invention when being used together with water as the carrier. Sludge F was used for this test. It was observed that introduction of the present invention was able to reduce the viscosity and pour point of the sludge. The sand settlement at the bottom was only observed in test sample treated with the present invention. The results are shown in Table 6 below.

TABLE 6

| Sample No. | Sludge (gram) | Carrier | Carrier (gram) | Oil phase in present invention | The present invention (gram) | Viscosity at 25° C. (cP) | Pour Point (° C.) | Viscosity at 25° C. after 24 hrs (cP) | Pour Point after 24 hrs (° C.) | Solid Sedimentation |
|---|---|---|---|---|---|---|---|---|---|---|
| Sludge F | | | | | | | | | | |
| F1 | 100 | Water | 50 | NA | 0 | >25,000 | >39 | >25,000 | >39 | No |
| F2 | 100 | Water | 50 | Natural oil | 1 | 5,000 | <9 | 5,000 | <9 | Yes |

EXAMPLE 6

This experiment test on the effectiveness of the present invention upon using different carriers namely water, mineral oil and diesel oil, Sludge G was used. It was observed that the present invention works well in different carriers. Test sample using water as the carrier is slightly less effective than using mineral oil and diesel oil as carrier in reducing viscosity of the sludge. The sand settlement was observed in all test samples. The results are shown in Table 7 below.

TABLE 7

| Sample No. | Sludge (gram) | Carrier | Carrier (gram) | Oil phase in present invention | The present invention (gram) | Viscosity at 25° C. (cP) | Pour Point (° C.) | Viscosity at 25° C. after 24 hrs (cP) | Pour Point after 24 hrs (° C.) | Solid Sedimentation |
|---|---|---|---|---|---|---|---|---|---|---|
| Sludge G | | | | | | | | | | |
| G1 | 15 | Water | 1.5 | NA | 0 | >25,000 | >39 | >25,000 | >39 | No |
| G2 | 15 | Water | 1.5 | Natural oil | 0.15 | 1,000 | No data | 800 | No data | Yes |
| G3 | 15 | Water | 2.5 | Natural oil | 0.15 | 800 | No data | 800 | No data | Yes |
| G4 | 15 | Mineral oil | 0.75 | Mineral oil | 0.15 | <800 | No data | <800 | No data | Yes |
| G5 | 15 | Diesel | 0.75 | Diesel | 0.15 | <800 | No data | <800 | No data | Yes |

EXAMPLE 7

Efficiency of the present invention for treating sludge containing high water content (>50 w/w %) and low oil content (~10 w/w %) was investigated in this experiment. Sludge H was used and two different carriers tested were water and toluene. The present invention together with water as the carrier show better effectiveness in reducing viscosity of the sludge. Solid sedimentation was clearly observed for test sample H1 only.

TABLE 8

| Sample No. | Sludge (gram) | Carrier | Carrier (gram) | Oil phase in present invention | The present invention (gram) | Viscosity at 25° C. (cP) | Solid Sedimentation |
|---|---|---|---|---|---|---|---|
| Sludge H | | | | | | | |
| H1 | 15 | Water | 15 | Natural oil | 0.15 | 1,200 | Yes |
| H2 | 15 | Toluene | 15 | Natural oil | 0.15 | Not flowing | No |

EXAMPLE 8

The impact of different kind of oil phase (natural oil, diesel oil, sarapar oil) was investigated in this experiment while water was selected as carrier. The sludge used in this example was sludge I with higher water content. The results showed in Table 9 indicate that different kind of oil phase functioned well in aqueous carrier in reducing the viscosity of the sludge, to lower than 100 cP. Solid was separated from the sludge for all cases.

TABLE 9

| Sample No. | Sludge (gram) | Carrier | Carrier (gram) | Oil phase in present invention | The present invention (gram) | Viscosity at 25° C. (cP) | Solid Sedimentation |
|---|---|---|---|---|---|---|---|
| Sludge I | | | | | | | |
| I1 | 15 | Water | 15 | Natural oil | 0.75 | <100 | Yes |
| I2 | 15 | Water | 15 | Diesel | 0.75 | <100 | Yes |
| I3 | 15 | Water | 15 | Sarapar 147 | 0.75 | <100 | Yes |

EXAMPLE 9

This example aims to compare the performance of the present invention with and without using the carrier. In one sample, light crude having density of 30° API was used as carrier for comparison. Sludge A was used for the test. It was found that using the present invention solely without carrier still worked effectively on sludge type A. Solid sedimentation was observed only in experiments without using carrier. The test results are shown in Table 10 below.

TABLE 10

| Sample No. | Sludge (w/w %) | Carrier | Carrier (w/w %) | Oil phase in present invention | The present invention (w/w % in total mixture) | Viscosity at 25° C. (cP) | Pour Point (° C.) | Viscosity at 25° C. after 24 hrs (cP) | Solid Sedimentation |
|---|---|---|---|---|---|---|---|---|---|
| Sludge A | | | | | | | | | |
| A4 | 80 | Light Crud Oil | 20 | NA | 0 | 18,700 | >45 | >25000 | No |
| A8 | 80 | No | 0 | Natural oil | 20 | 1,300 | <15 | 1300 | Yes |
| A9 | 90 | No | 0 | Natural oil | 10 | 2,500 | <15 | 2500 | Yes |

EXAMPLE 10

This example aims to investigate the effectiveness of the present invention at very low concentration (approximately nearly 100 ppm or 0.01 w/w % in sludge) with the presence of the carrier. Light crude having density of 30° API was used as carrier for comparison. 5% of the carrier was used for the study. Sludge A was used for the test. It was found that the present invention at very low concentration still worked effectively on sludge type A in the presence of carrier to reduce the viscosity below 5000 cP (pumpable condition) and pour point of the sludge as well as promoting the solid particle sedimentation.

TABLE 11

| Sample No. | Sludge (w/w %) | Carrier | Carrier (w/w %) | Oil phase in present invention | The present invention (w/w % in total mixture) | Viscosity at 25° C. (cP) | Pour Point (° C.) | Viscosity at 25° C. after 24 hrs (cP) | Solid Sedimentation |
|---|---|---|---|---|---|---|---|---|---|
| Sludge A | | | | | | | | | |
| A10 | 95 | Light Crud Oil | 5 | Natural oil | 0 | >25000 | >45 | >25000 | No |
| A11 | 94.99 | Light Crud Oil | 5 | Natural oil | 0.01 | 3,400 | <15 | 3,400 | Yes |

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

The invention claimed is:

1. A method of treating a first batch of oil sludge containing entrapped oil residue, comprising the steps of:
   bringing into contact the first batch of oil sludge to a liquid composition of an emulsion with or without a carrier, wherein the emulsion comprises an alkylpolyglucoside surfactant in 2 to 8% by weight of total composition, a co-surfactant in 1 to 30% by weight of total composition selected from the group consisting of C3 to C18 alcohols, C3 to C18 alkyl lactates, lecithins, C3 to C18 fatty acids and any mixtures thereof, an oil phase in the range of 15 to 90% by weight of the total composition, and an aqueous phase in the range of 0.5 to 20% by weight of total composition;
   homogenizing the liquid composition with the first batch of oil sludge; and
   fluidizing the oil sludge, wherein the oil residues are substantially dissociated from any solid objects so as to form a liquid phase, wherein the liquid phase includes the liquid composition and separated oil.

2. The method according to claim 1, further comprising the steps of:
   recycling the liquid phase or a portion of the liquid phase to a second batch of oil sludge, wherein the second batch of oil sludge contains oil residues entrapped to the solid objects; and
   homogenizing the liquid phase or the portion of the liquid phase to the second batch of oil sludge to separate the oil residues from the solid objects.

3. The method according to claim 1, further comprising the steps of:
   continuously removing the separated solid objects from the liquid phase; and
   optionally, adding a new volume of oil sludge into the liquid phase.

4. The method according to claim 1, further comprising the step of heating the liquid composition and the first batch of oil sludge during the homogenizing step.

5. The method according to claim 1, wherein the emulsion has a concentration in the range of 0.01 to 10% by weight of the total liquid composition when the carrier is used.

6. The method according to claim 1, wherein the liquid composition and the oil sludge are in a ratio in the range of 1-10:20 by weight percentage.

7. The method according to claim 1, wherein the carrier is selected from the group consisting of light crude oil, paraffin oil, diesel, mineral oil, kerosene, glycols, liquid hydrocarbons with a viscosity less than 5000 cps at 25° C., water, salt water, brine and combinations thereof.

8. The method according to claim 1, wherein the emulsion further comprises a pour point depressant or wax inhibitors selected from the group consisting of ethylene/alkene copolymers, ethylene/vinyl acetate copolymers, ethylene acrylonitrile copolymers, acrylate ester polymers, methacrylate ester polymers, maleic copolymers, alkyl phenol-formaldehyde resins, hexatriethanolamine oleate esters, polyolefins and combinations thereof present in an amount of 5 to 40% by weight of the total composition.

9. The method according to claim 1, wherein the emulsion further comprises a stabilizer selected from the group consisting of dodecylbenzenesulfonic acid, arylalkanesulfonates, sulfosuccinate esters, alkyldiphenylether sulfonates, alkyldiphenylether disulfonates alkylnaphthalenesulfonates, naphthalenesulfonic acid-formaldehyde condensates and combinations thereof present in an amount of 1 to 10% by weight of the total composition.

10. The method according to claim 1, wherein the oil phase is selected from the group consisting of terpenes, aromatic hydrocarbons, glycols, esters, fatty acid ester, fatty ester, glycol ethers, mineral oil, paraffin oil, plant-based oil, diesel, petroleum distillates and combinations thereof.

11. The method according to claim 1, wherein the emulsion further comprises an oxidizing biocide selected from the group consisting of chlorine/hypochlorite or bromide/hypochlorite, hypochlorite salts, hypobromite salts, stabilized bromine chloride, hydroxyl radicals, chloramines, chlorine dioxide, chloroisocyanurates, halogen-containing hydantoins, hydrogen peroxide, hydrogen peracetic acid and combinations thereof present in the range of 1 to 5% by weight of the total composition.

12. The method according to claim 1, wherein the emulsion further comprises a non-oxidizing biocide selected from the group consisting of aldehyde biocides, quaternary phosphonium compounds, quaternary ammonium surfactants, cationic polymers, organic bromides, metronidazole, isothiazoles, isothiazolinones, thiones, organic thiocyanates, phenolic biocide, alkylamines, diamines, triamines, dithiocarbamates, 2-(decylthio)ethanamine and its hydrochloride, triazine derivatives, oxazolidines and combinations thereof present in the range of 1 to 5% by weight of the total composition.

13. The method according to claim 1, wherein the emulsion further comprises a chelating agent selected from the group consisting of ethylenediamine tetraacetic acid, hydroxyethylenediamine triacetic acid, nitriolotriacetic acid, citric acid, acetylacetone, porphyrin, catechol, dithiolene phosphonic acids and their salts, polyphosphates, phosphate esters, nonpolymeric phosphonates, aminophosphonates, polyphosphonates phosphino polymers, polyphosphinates, polycarboxylates, polysulfonates and combinations thereof present in an amount of 1 to 10% by weight of the total composition.

14. The method according to claim 1, wherein the emulsion further comprises a corrosion inhibitor selected from the group consisting of phosphate esters, amine salts of carboxylic acid, amine salts of polycarboxylic acid, quaternary ammonium salts, quaternary imminium salts, amidoamines, imidazolines, amides, polyhydrxy amines, polyhydroxy amides, ethoxylated amines, ethoxylated amides, polyaminoacides and combinations thereof present in the range of 1 to 5% by weight of the total composition.

15. The method according to claim 1, wherein the emulsion further comprises an acid selected from the group consisting of gluconic acid, lactic acid, methanesulfonic acids, urea hydrochloride, acetic acid, formic acid, citric acid, carboxylic acids with linear or branched alkyl groups and number of carbon atoms in the alkyl group from about 3-18, hydrochloric acid, hydrofluoric acid, hydrobromic acid, phosphoric acid, sulfuric acid, nitric acid, boric acid and combinations thereof present in the range of 5 to 10% by weight of the total composition.

16. The method according to claim 1, wherein the emulsion further comprises a flocculant selected from the group consisting of iron(III) salts, zinc(II) salts, aluminum(III) salts diallyldimethylammonium chloride polymers, acrylamide-based polymers, acrylate-based polymers, polyalkyleneimines, polyalkanoamines, polyvinylammonium chloride, polyallylammonium chloride, branched polyvinylimidazoline acid salts, polysaccharides, chitosan, condensed tannins, dithiocarbamates, hydrolyzed polyacrylamide-grafted xanthan gum, poly-γ-glutamic acid, and polyaspartic acid and combinations thereof present in the range of 1 to 10% by weight of the total composition.

17. The method according to claim 1, wherein the emulsion has a surfactant/cosurfactant ratio in the range of 1/10 to 20/1.

18. The method according to claim 2, wherein the oil phase is selected from the group consisting of terpenes, aromatic hydrocarbons, glycols, esters, fatty acid ester, fatty ester, glycol ethers, mineral oil, paraffin oil, plant-based oil, diesel, petroleum distillates and combinations thereof.

19. The method according to claim 2, wherein the emulsion further comprises an oxidizing biocide selected from the group consisting of chlorine/hypochlorite or bromide/hypochlorite, hypochlorite salts, hypobromite salts, stabilized bromine chloride, hydroxyl radicals, chloramines, chlorine dioxide, chloroisocyanurates, halogen-containing hydantoins, hydrogen peroxide, hydrogen peracetic acid and combinations thereof present in the range of 1 to 5% by weight of the total composition.

20. The method according to claim 2, wherein the emulsion further comprises a non-oxidizing biocide selected from the group consisting of aldehyde biocides, quaternary phosphonium compounds, quaternary ammonium surfactants, cationic polymers, organic bromides, metronidazole, isothiazoles, isothiazolinones, thiones, organic thiocyanates, phenolic biocide, alkylamines, diamines, triamines, dithiocarbamates, 2-(decylthio)ethanamine and its hydrochloride, triazine derivatives, oxazolidines and combinations thereof present in the range of 1 to 5% by weight of the total composition.

21. The method according to claim 2, wherein the emulsion further comprises a chelating agent selected from the group consisting of ethylenediamine tetraacetic acid, hydroxyethylenediamine triacetic acid, nitriolotriacetic acid, citric acid, acetylacetone, porphyrin, catechol, dithiolene phosphonic acids and their salts, polyphosphates, phosphate esters, nonpolymeric phosphonates, aminophosphonates, polyphosphonates phosphino polymers, polyphosphinates, polycarboxylates, polysulfonates and combinations thereof present in the range of 1 to 10% by weight of the total composition.

22. The method according to claim 2, wherein the emulsion further comprises a corrosion inhibitor selected from the group consisting of phosphate esters, amine salts of carboxylic acid, amine salts of polycarboxylic acid, quaternary ammonium salts, quaternary imminium salts, amidoamines, imidazolines, amides, polyhydrxy amines, polyhydroxy amides, ethoxylated amines, ethoxylated amides, polyaminoacides and combinations thereof present in the range of 1 to 5% by weight of the total composition.

23. The method according to claim 2, wherein the emulsion further comprises an acid selected from the group consisting of gluconic acid, lactic acid, methanesulfonic acids, urea hydrochloride, acetic acid, formic acid, citric acid, carboxylic acids with linear or branched alkyl groups and number of carbon atoms in the alkyl group from about 3-18, hydrochloric acid, hydrofluoric acid, hydrobromic acid, phosphoric acid, sulfuric acid, nitric acid, boric acid and combinations thereof present in the range of 5 to 10% by weight of the total composition.

24. The method according to claim 2, wherein the emulsion further comprises a flocculant selected from the group consisting of iron(III) salts, zinc(II) salts, aluminum(III) salts diallyldimethylammonium chloride polymers, acrylamide-based polymers, acrylate-based polymers, polyalkyleneimines, polyalkanoamines, polyvinylammonium chloride, polyallylammonium chloride, branched polyvinylimidazoline acid salts, polysaccharides, chitosan, condensed tannins, dithiocarbamates, hydrolyzed polyacrylamide-grafted xanthan gum, poly-γ-glutamic acid, and polyaspartic acid and combinations thereof present in the range of 1 to 10% by weight of the total composition.

25. The method according to claim 2, wherein the emulsion has a surfactant/cosurfactant ratio in the range of 1/10 to 20/1.

* * * * *